(12) United States Patent
Hilsman et al.

(10) Patent No.: US 7,913,856 B2
(45) Date of Patent: Mar. 29, 2011

(54) SYSTEM AND METHOD FOR CLEANING FUEL STORAGE TANKS

(75) Inventors: Russell H. Hilsman, Kasson, MN (US); Douglas James Mohler, Zumbro Falls, MN (US)

(73) Assignee: PetroResOne, Inc., Edina, MN (US)

( * ) Notice: Subject to any disclaimer, the term of this patent is extended or adjusted under 35 U.S.C. 154(b) by 208 days.

(21) Appl. No.: 12/329,187

(22) Filed: Dec. 5, 2008

(65) Prior Publication Data

US 2009/0145853 A1 Jun. 11, 2009

Related U.S. Application Data

(60) Provisional application No. 61/005,946, filed on Dec. 7, 2007.

(51) Int. Cl.
*B01D 29/00* (2006.01)
(52) U.S. Cl. ......... 210/416.4; 210/85; 210/97; 210/134; 210/172; 210/1; 210/241; 210/257.7; 210/340; 210/416.1; 210/418
(58) Field of Classification Search ............... 210/172.1, 210/340, 241, 416.4, 428, 134; 15/301, 314, 15/315; 239/71, 590; 134/167 R, 169 A, 134/168 C, 167 C
See application file for complete search history.

(56) References Cited

U.S. PATENT DOCUMENTS

| | | | |
|---|---|---|---|
| 4,447,332 A | 5/1984 | Crisman et al. | |
| 4,534,869 A | 8/1985 | Seibert | |
| 4,536,789 A | 8/1985 | Bains | |
| 4,954,267 A | 9/1990 | Uremovich | |
| 5,205,174 A | 4/1993 | Silverman et al. | |
| 5,336,418 A | 8/1994 | Rawlins | |
| 5,956,077 A | 9/1999 | Qureshi et al. | |
| 6,596,174 B1 | 7/2003 | Marcus | |
| 6,686,950 B1 | 2/2004 | Caffon et al. | |
| 7,481,919 B1 * | 1/2009 | Keenan | 210/110 |
| 2006/0231501 A1 | 10/2006 | Sundeng | |

* cited by examiner

*Primary Examiner* — Duane Smith
*Assistant Examiner* — Paul J Durand
(74) *Attorney, Agent, or Firm* — Merchant & Gould P.C.

(57) ABSTRACT

Systems and methods for cleaning a fuel storage tank are disclosed. One system includes a plurality of filter elements mounted within a portable housing, and a hose in fluidic connection to at least some of the filter elements, the hose extendable from the portable housing and into an interior of a fuel storage tank, the hose having a nozzle including an inlet. The system also includes a pump in fluidic connection with one or more of the filter elements and configured to draw contents of the fuel storage tank into the hose and forward the contents through the one or more filter elements. The system further includes a video camera configured to capture video images of the interior of the fuel tank in an area proximate to the nozzle of the hose during cleaning.

15 Claims, 16 Drawing Sheets

SYSTEM AND METHOD FOR CLEANING FUEL STORAGE TANKS

CROSS REFERENCE TO RELATED APPLICATIONS

The present application claims priority to U.S. Provisional Patent Application No. 61/005,946, filed Dec. 7, 2007, the disclosure of which is hereby incorporated by reference in its entirety.

TECHNICAL FIELD

The present invention relates generally to filtration systems. More specifically, the present disclosure relates to systems and methods for cleaning fuel storage tanks.

BACKGROUND

Fuel storage tanks, such as the underground tanks at service stations, collect water and other contaminants. These contaminants (bacteria, sludge, etc.) can enter the fuel tanks by way of leaks, condensation, drainage, or other sources. Typically, these fuel storage tanks are not easily accessible, due to their size and location.

When fuel is removed from a fuel storage tank, it is generally passed through a filter prior to its dispensation. However, if the fuel includes a large amount of contamination, these filters can become clogged and prevent passage of fuel out of the tank. Therefore, it is preferable to clean fuel tanks periodically to prevent buildup of water or contaminants.

Due to the lack of accessibility of the interior of fuel storage tanks, it can be difficult to see the contaminants in the tank, and to easily reach all areas of the tank for cleaning. Existing fuel tank cleaning systems generally include a filter mechanism, but provide little feedback to a user with respect to the cleanliness of the tank, making it difficult to determine when the tank has been completely cleaned. Furthermore, existing cleaning systems either provide no visual inspection capabilities or use fiber optics to allow viewing of the interior of the tank. For example, the existing systems that do provide viewing of the interior of the tank generally require an operator to look at a small scope, making visual inspection difficult. These systems are typically limited to 50 feet in length, and are non-recordable. Existing systems also are large, have limited portability, and are expensive to maintain.

For these and other reasons, improvements are desirable.

SUMMARY

In accordance with the present disclosure, the above and other problems are solved by the following:

In a first aspect, a system for cleaning a fuel storage tank is disclosed. The system includes a plurality of filter elements mounted within a portable housing, and a hose in fluidic connection to at least some of the filter elements, the hose extendable from the portable housing and into an interior of a fuel storage tank, the hose having a nozzle including an inlet. The system also includes a pump in fluidic connection with one or more of the filter elements and configured to draw contents of the fuel storage tank into the hose and forward the contents through the one or more filter elements. The system further includes a video camera configured to capture video images of the interior of the fuel tank in an area proximate to the nozzle of the hose during cleaning.

In a second aspect, a method of cleaning fuel storage tanks is disclosed. The method includes extending a hose from a portable housing, the hose providing a conduit to a plurality of filter elements. The method further includes inserting at least a portion of the hose into a fuel storage tank. The method also includes activating a pump to draw a fuel mixture from the fuel storage tank into the hose and through a plurality of filter elements, thereby filtering the fuel mixture. The method also includes capturing video of the interior of the fuel storage tank.

In a third aspect, a portable system for cleaning a fuel storage tank is disclosed. The portable system includes a portable housing and a hose mounted on a hose reel and extendable from the portable housing into the fuel storage tank. The portable system further includes a pump configured to draw a fuel mixture from the fuel storage tank through the hose. The portable system further includes a plurality of filtration systems, each of the filtration systems including a plurality of filter elements. The portable system also includes a plurality of waste tanks, a water filter connected to each of the plurality of filtration systems, and a filtered fuel return conduit connected to the water filter. The portable system includes a control panel including a plurality of valves configured to route the fuel mixture from the pump to either one or more of the filtration systems or one or more of the waste tanks. The portable system also includes a video camera configured to capture video images of the interior of the fuel tank during cleaning, and a monitor configured and arranged to display video images captured by the video camera.

DETAILED DESCRIPTION

Figure 1:
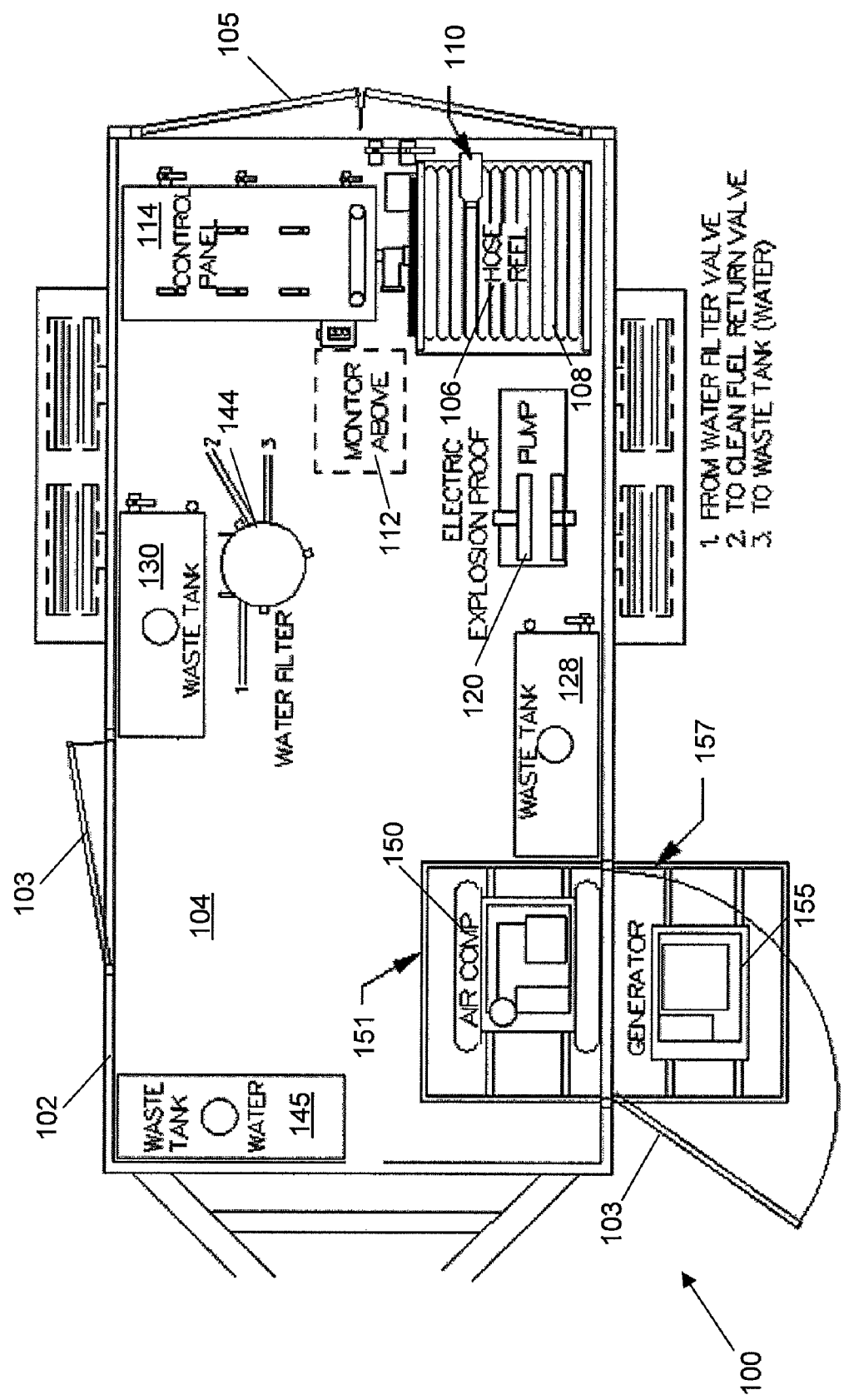
FIG. 1 is a floor plan of a system for cleaning fuel storage tanks, in accordance with a possible embodiment of the present disclosure.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general the present disclosure relates to a system and method for cleaning fuel tanks. The fuel tanks to be cleaned can be underground or above-ground fuel tanks such as those used by service stations or storage facilities. The systems and methods of the present disclosure provide for convenient and interactive fuel tank cleaning to ensure a thorough cleaning process is performed.

Although, in general, the present disclosure describes cleaning of fuel tanks, it is understood that the present disclosure generally relates to cleaning of the contents of fuel tanks, e.g. by removing particulate matter, non-fuel liquids (e.g. water), and other unwanted components from the fuel tanks being cleaned. By cleaning of the contents of fuel tanks, the fuel tanks that are the focus of the cleaning process are cleaned as well.

In certain embodiments of the present disclosure, the fuel tank cleaning systems described herein are trailer-portable, and include a multi-stage filtration system and a video system to assist operators in viewing the status of the inside of a fuel holding tank. The system allows an operator to clean the tank without entering the tank or otherwise interrupting operation of the service station.

Referring now to FIGS. 1-5, a system 100 for cleaning fuel tanks is shown, in accordance with a possible embodiment of the present disclosure. The system 100 includes a housing 102, which encloses an internal area 104 where various filtration components of the system reside, and where extending/removable components are stored for transportation. In the embodiment shown, the housing 102 is a trailer arrangement capable of being towed by a vehicle, providing portability of the system 100 for use at any of a variety of locations having immobile fuel storage tanks. In the embodiment shown, the housing 102 includes side door openings 103 and rear door openings 105, providing access to the internal area 104. However, other housing configurations may be possible as well.

Along the left side of the housing 102, a hose reel 106 is mounted at a rear portion of the interior area 104. The hose reel 106 stores a hose 108, and preferably resides at an opening of the housing 102. The hose 108 is extendable through the opening in the housing 102 to be inserted into a fuel tank to be cleaned. The hose reel 106 allows extension and retraction of the hose 108, and can be rotationally affixed in place when the system 100 is not in operation. The hose 108 can be generally any length desirable, and is configured to withstand suction pressure to draw fuel and other items from the tank being cleaned. In certain embodiments, the hose 108 is an approximately 1.5 inch diameter hose; however, other diameters can be used as well to accommodate throughput of a large capacity of gas, depending upon the throughput of the filters and pumps used in the remainder of the system 100. The hose 108 also includes a video camera 110, allowing the operator of the system to view the inside of the gas tank via a monitor 112 mounted within the housing 102. Additional details of the hose reel 106, video camera 110, and monitor 112 are described below in conjunction with FIGS. 6-8.

Fuel and impurities drawn into the hose 108 are passed into a conduit and routed to a control panel 114. The control panel 114, shown in detail in FIGS. 4-5, includes a user interface side including fluid valves capable of controlling and routing various aspects of the fuel tank cleaning process. The fuel and impurities drawn into the hose 108 are passed through an emergency shut-off valve 116. The emergency shut-off valve 116 allows an operator to halt suction through the hose, in the case of a blockage, or other condition.

Figure 2:
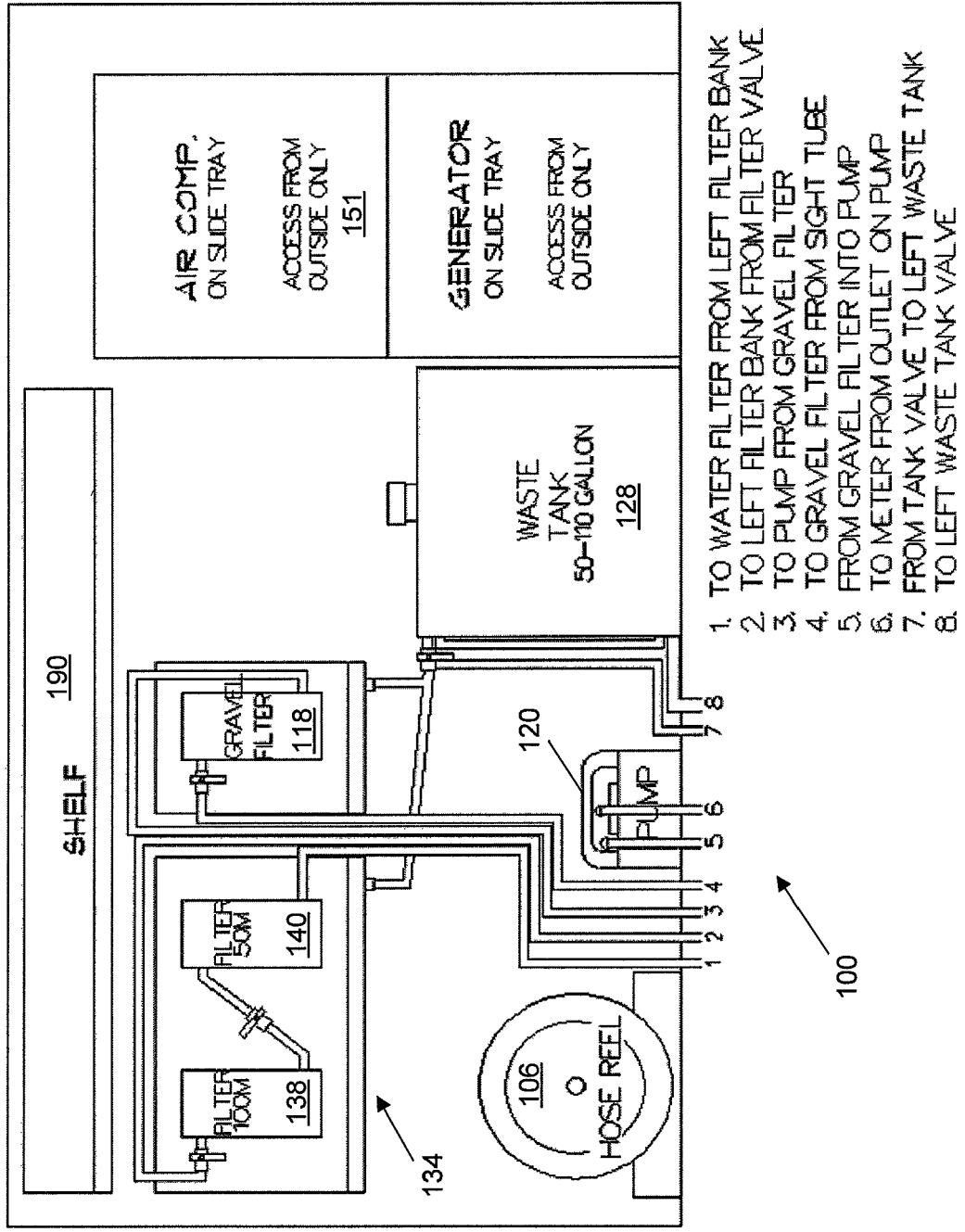
FIG. 2 is a left side schematic view of the system of FIG. 1.
Figure 3:
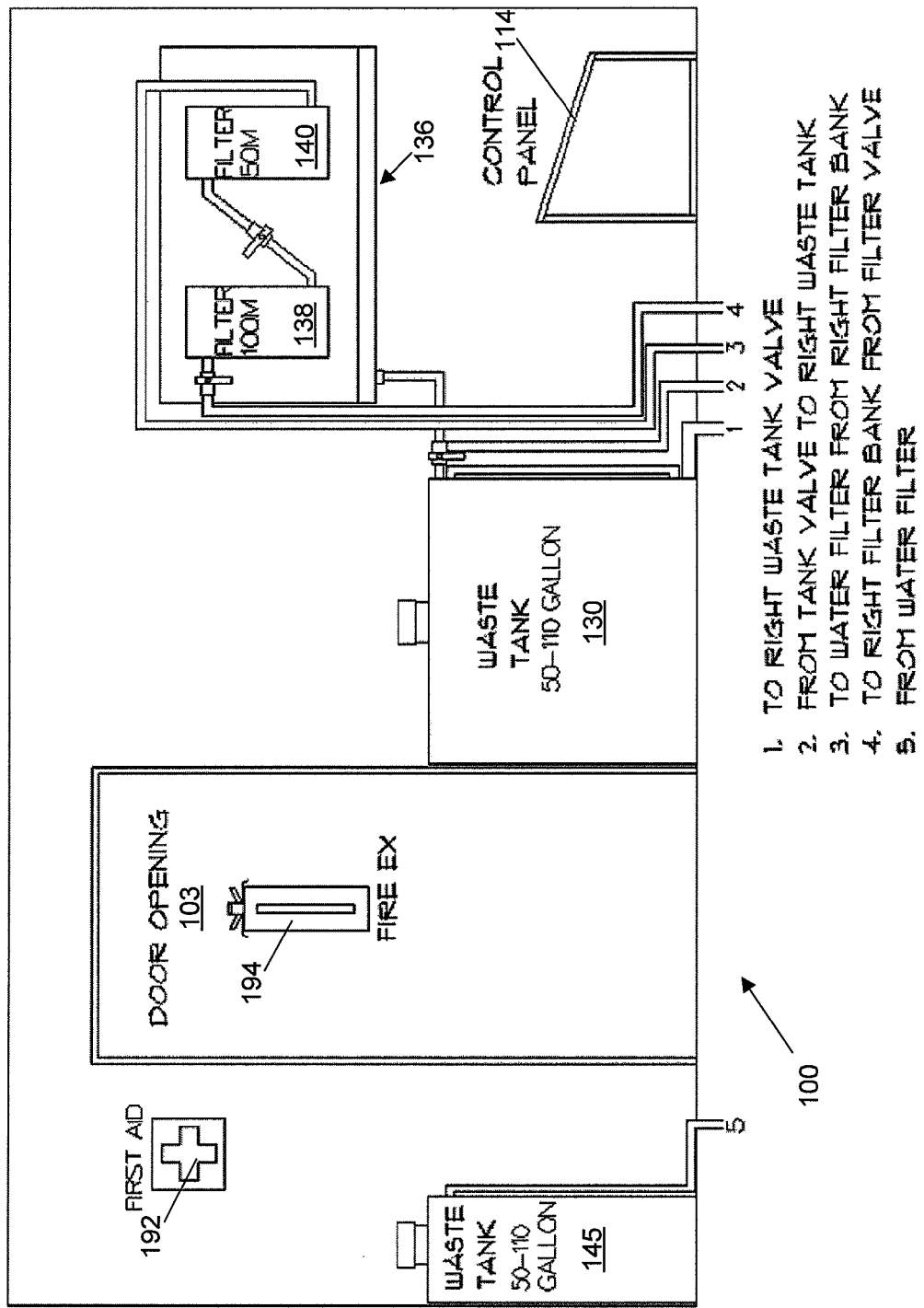
FIG. 3 is a right side schematic view of the system of FIG. 1.

The fuel and impurities pass through an open shut-off valve 116 in the control panel and proceed past a visual checkpoint 117 in the control panel 114 to a gravel filter 118, seen in FIG. 2. The visual checkpoint 117 is a clear piece of conduit (e.g. clear PVC pipe or other conduit) located in a line of vision of the operator (e.g. as viewed through an opening in the control panel 114 exposing the conduit). The visual checkpoint 117 allows the operator of the system 100 to view the fuel in the condition it is in when it is drawn from the tank being cleaned.

The gravel filter 118 strains solid particulates from the fuel mixture. From the gravel filter 118, the fuel mixture passes through conduit to a pump 120. The pump 120 provides suction (vacuum) to the hose 108, pulling the fuel and impurities out of the tank being cleaned and through the hose, shut-off valve 116, and gravel filter 118. The pump 120 likewise provides a low downstream pressure to force the fuel mixture into the various other filtering and routing components of the system, as described below. The pump 120 can be any of a number of types of liquid pumps capable of pressurized applications, as used in liquid filtration. In the embodiment shown, the pump 120 is manufactured by Dixon Pumps of Billings, Mont. Other pumps could be used as well.

The fuel mixture exits the pump 120 and is routed via a conduit back to the control panel 114, past a meter 122. The meter 122 determines a pressure on a downstream side of the pump, to determine the resistance of the various filters and hoses in the system (e.g. to detect blockages or dirty filters, etc.). The meter 122 can also determine a number of additional features of the fuel mixture, such as its temperature, flow rate, clarity, or other measurable factors. After passing the meter 122, the fuel mixture is routed via the conduit to a route selection valve 124. The route selection valve 124 allows an operator to select whether to route the fuel mixture for either (1) filtration or (2) cast-off, in case the fuel mixture is unfilterable (i.e. it is too thick to pass through the filters, as determined by the meter 122, or by sight, using the monitor 112 and/or visual checkpoint 117).

If the operator deems that the fuel mixture is not filterable and the route selection valve 124 is switched to cast off the mixture, a conduit leading from the valve routes the fuel mixture to a tank selection valve 126, also on the control panel 114. The tank selection valve is a three-way valve that allows the operator to route the unfilterable fuel mixture to either of two waste tanks 128, 130. The waste tanks 128, 130 each hold, in the embodiment shown, up to about 50-110 gallons of filtered water, bacteria, and unfilterable fuel mixture. The waste tanks are connected via a conduit to first and second waste dump valves 129, 131 on the control panel 114, which allow an operator to empty the filtered waste from the system 100 (e.g. after a fuel tank has been cleaned and the system has been transported to a waste dumping facility).

Other arrangements of the waste tanks 128, 130 are possible as well. For example, in an alternative embodiment, the waste tanks 128, 130 can be located in a waste tank arrangement external to the housing 102, and a waste hose or other conduit can be connectable to the separate, portable or non-portable waste tank arrangement.

If the operator deems, based on the information observed at the monitor 112, meter 122, and/or visual checkpoint 117, that the fuel mixture can be filtered and therefore sets the route selection valve 124 to filter the fuel mixture, a second conduit leading from the valve routes the fuel mixture to a filter selection valve 132, on the control panel 114. The filter selection valve 132 is a three-way valve that allows the operator to route the filterable fuel mixture to either of two two-stage filtration systems 134, 136. Each of the two-stage filtration systems includes a first filter 138 capable of performing a first-stage, coarse filtration, and also includes a second filter 140 capable of performing a second-stage, fine particle filtration. In the embodiment shown, the first-stage filter 138 provides filtration to remove particulate matter down to a size of about 100 microns, while the second-stage filter 140 provides filtration of particulate matter down to a size of about 50 microns. Other sizes and arrangements of filters can be used as well, to provide a desired level of cleaning of the fuel passing through the system 100.

In the filtration systems 134, 136, any of a variety of filter elements can be used within the first and second filters 138, 140, respectively. In an example embodiment, filter cartridges can be used from Rosedale Products, Inc. of Ann Arbor, Mich., in the first and second filters. Other types or brands of filters can be used as well.

In some embodiments, the filter selection valve 132 can be switched from one of the two-stage filtration systems to the other stage upon detection of certain conditions, such as upon detection of a high pressure (as might indicate a blockage or clogged filter). In such instances, an operator may choose to pause cleaning a fuel tank to allow an opportunity to clean or replace the clogged filter. In other instances, where two operators are performing a cleaning process, one of the operators may continue to clean the fuel tank while the second operator can clean or replace the filter elements of the unselected filtration system.

Figure 5:
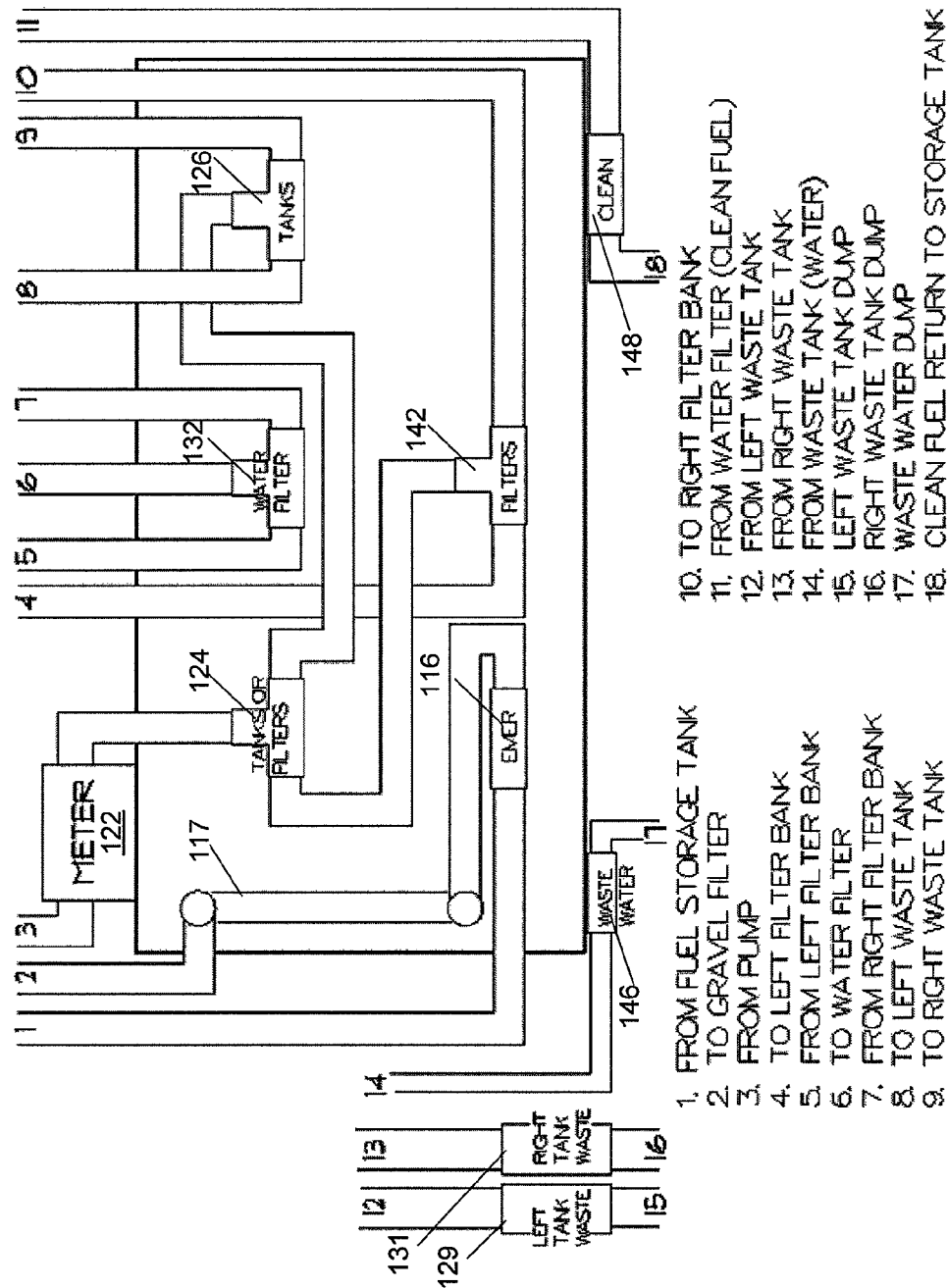
FIG. 5 illustrates the control panel valves useable to control the fluidic connections shown in FIG. 4.

After passage through either the first or second filtration systems 134, 136, the fuel mixture generally will be filtered of particulate matter, but may still include some water that has passed, along with the fuel, through the system 100. The fuel mixture is passed through a conduit (from both of the filtration systems, as seen in FIG. 5) to a water separator valve 142 on the control panel 114. The water separator valve 142 allows the operator to select and route filtered fuel from either of the first and second filtration systems to a water filter 144. The water filter 144 generally separates the water and fuel, and can, in certain embodiments, be a coalescer/separator filtration system. One example such system is a Valcon VX-1 water coalescer/separator. In other embodiments, other types of water/fuel filtration are possible as well.

Generally, operation of the water separator valve 142 is coordinated with operation of the filter selection valve 132, to ensure that the fuel mixture entering one of the two-stage filtration systems 134, 136 can then exit that active system for water filtration.

From the water filter 144, any separated waste water is routed via a first conduit to a waste tank 145. The waste tank 145 is, similar to the waste tanks 128, 130 above, a 50-110 gallon tank. A waste water valve 146 on the control panel 114 can be used by the operator to selectively allow the waste water in the tank 145 to be discarded. In some embodiments, the waste water is dumped at a faucet local to the control panel, and can be collected and discarded as desired. In further embodiments, the waste water valve 146 allows the user to route the waste water back to one or both of the other waste tanks 128, 130 for storage and disposal.

Also from the water filter 144, the now-filtered fuel is routed via a second conduit to a clean fuel valve 148 on the control panel 114. The clean fuel valve allows an operator to selectively allow passage of clean fuel into a storage tank, such as by returning the clean fuel into the tank being cleaned. By returning the filtered fuel into the tank being cleaned, gradually that tank will contain only cleaned fuel, as all of the fuel and other contents of the tank will have passed through the system 100.

An air compressor 150 can be included within the housing 102, and can be used in any of a number of applications. In certain embodiments, the air compressor provides pressure for operation of the pump 120, and can be used to power other components of the system as well. The air compressor 150 can be any of a number of types of air compressors, such as are commonly available. In the embodiment shown, the air compressor is located within a separate air compressor enclosure 151 within the housing 102, to ensure that the air compressor can only be accessed from external to the housing 102; however, other arrangements and locations for the air compressor are possible as well.

Additionally, a generator 155 can be included in the enclosure 151, and can be placed on one of a plurality of slide-out trays 157, to be removed from the enclosure for service and/or operation. The generator can be used to power the pump 120, monitor 112, or other items within the enclosure. In certain embodiments, the air compressor 150 can be placed on a slide-out tray as well.

Figure 6:
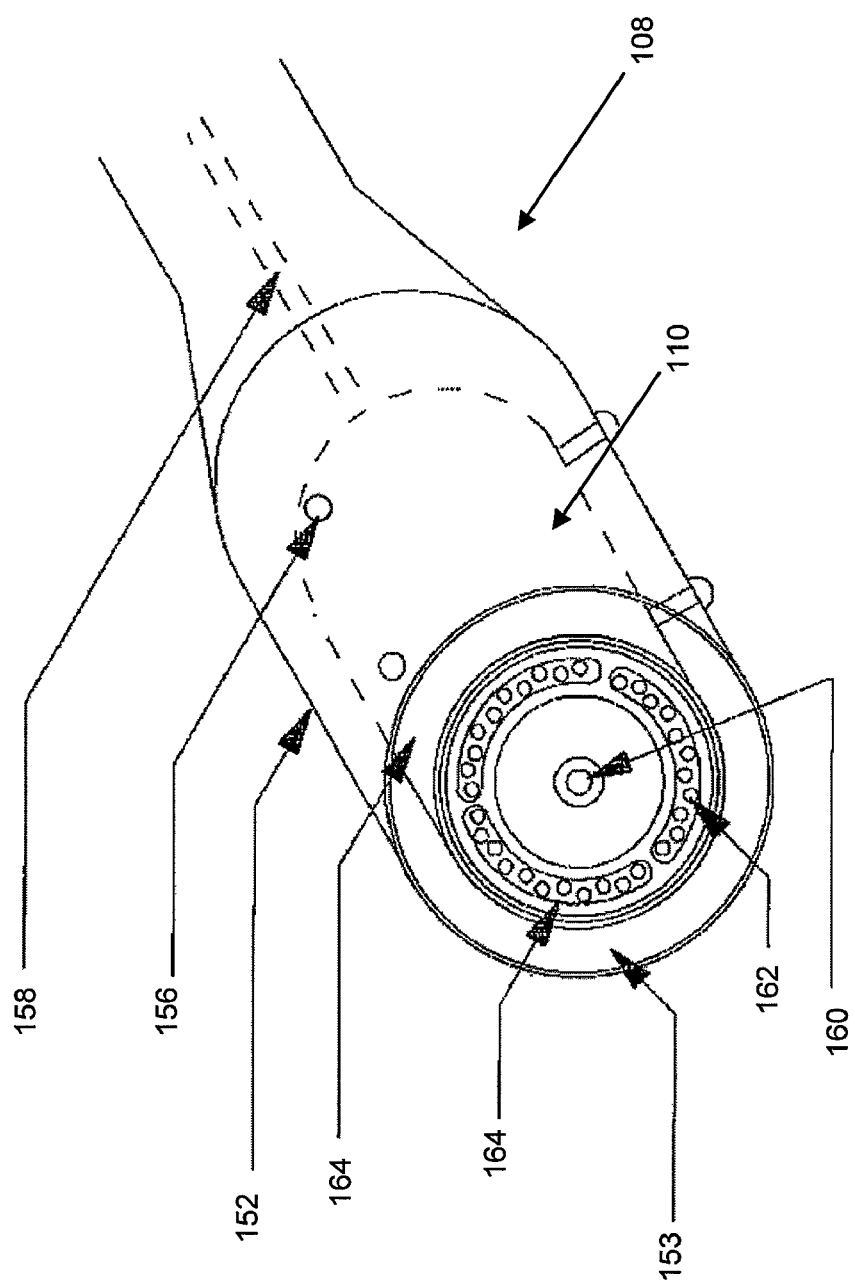
FIG. 6 is a schematic view of a hose end having an integrated video camera, in accordance with a possible embodiment of the present disclosure.

Referring now to FIG. 6, additional details of the hose 108 and video camera 110 are shown in further detail, in conjunction with one possible embodiment of the present disclosure. In the embodiment shown, the hose 108 includes a nozzle 152 on the end to be extended into the fuel tank for cleaning. The nozzle 152 has an inlet 153 that allows suction of fuel, sludge, and other components of a fuel mixture from the tank into the hose 108 for cleaning using the system 100.

The nozzle 152 houses the video camera 110, which is mounted within the nozzle by a plurality of mounting pins 156 such that the inlet 153 forms a concentric circle around the camera 110. The video camera 110 is generally a compact, color video camera capable of being submerged in liquid while under operation. The camera 110 is generally configured to record the status of the storage tank and fuel held within the storage tank, before, during, and after a cleaning process, for display and recording using the monitor 112. The video camera 110 generally captures video images of the interior of the fuel tank in an area proximate to the nozzle 152 during cleaning.

Although, in the embodiment shown, the video camera 110 is illustrated as integrated into the nozzle 152, it is understood that in alternative embodiments the video camera 110 can be separated from the nozzle 152 and oriented to allow a user to view the portion of the interior of the fuel tank to be cleaned.

In the embodiment shown, the camera 110 can withstand high liquid pressure, and is explosion-proof. A wire 158 runs through the hose to the hose reel 106, and carries power to the video camera 110 and the video signal back to the system 100 (e.g. to the monitor 112). Other video or electrical signals can be carried along the wire as well.

In the embodiment shown, the camera 110 includes a self-leveling color lens 160, such as are provided by MyTana Manufacturing Co. of St. Paul, Minn. Of course, other types of lenses and protective covers for the camera 110 can be used as well.

An array of light emitting diodes 162 are positioned in a concentric circle around the camera 110, and oriented outward from the end of the nozzle 152. The light emitting diodes 162 illuminate the area in the fuel storage tanks at the inlet end of the nozzle 152, allowing the video camera 110 to capture images of the fuel storage tank and the fuel within the tank. A sapphire lens 164 can be placed over the light emitting diodes 162 to protect the diodes while allowing light to pass through. In the embodiment shown, 32 light emitting diodes 162 are shown to be covered by the sapphire lens 164. In other embodiments, more or fewer diodes can be included in the nozzle 152.

In the embodiment shown, the array of light emitting diodes 162 and video camera 110 are housed within a protective housing 164, which is held within the nozzle 152 by the pins 156. The protective housing 164 can be, in various embodiments, a copper, brass, or other metallic housing capable of shielding electronic equipment from the fuel mixture drawn into the inlet 153.

Figure 7:
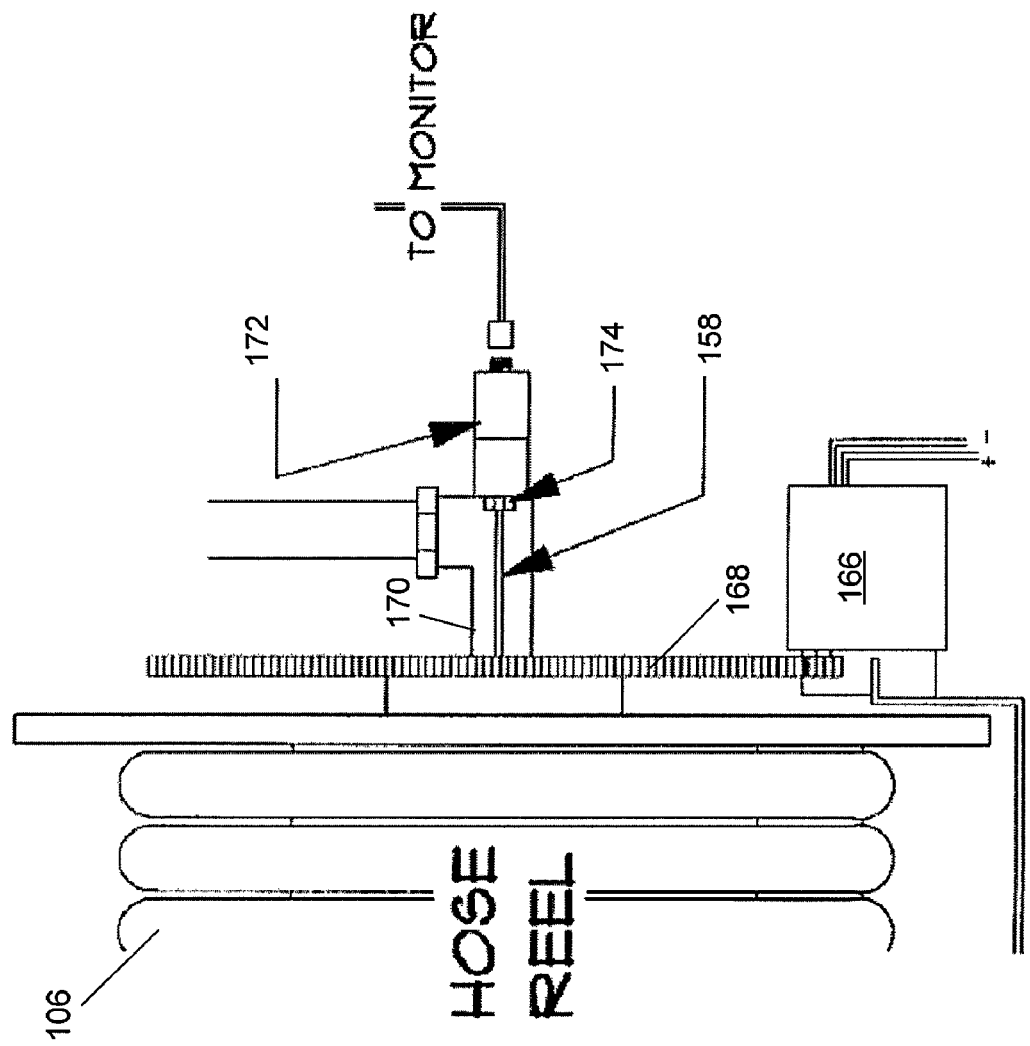
FIG. 7 is a partial schematic view of a hose reel useable in the system of FIG. 1.

Referring now to FIG. 7, additional details of the hose reel 106 and hose 108 are shown in further detail, in conjunction with one possible embodiment of the present disclosure. In the embodiment shown, the hose reel 106 is driven by a motor 166, which turns a gear 168 affixed to a shaft of the hose reel 106. The motor 166 can be driven by a switch or other electrical control at the control panel 114. In alternative embodiments, the hose reel 106 can be manually operated.

A conduit section 170 extends from the shaft of the hose reel 106, and includes the wire 158 leading to the nozzle 152 and video camera 154, as previously described. The wire 158 connects to a slip feed 172 at a sealed bearing 174, allowing the wire 158 to exit the conduit section 170 and be routed to the monitor 112. A further conduit section 176 connects to the conduit section 170 at a T-junction, through which the fuel mixture drawn from the fuel storage tank is routed (and to the emergency shut-off valve 116 of the control panel 114, gravel filter 118, etc. as previously described). In the embodiment shown, the slip feed 172 is a teflon electric explosion-proof slip feed arrangement, and connects to the sealed bearing 174 to prevent leakage of the fuel mixture, and minimize wear on the bearing and slip feed due to gravel or other particulate matter in the fuel mixture.

Figure 8:
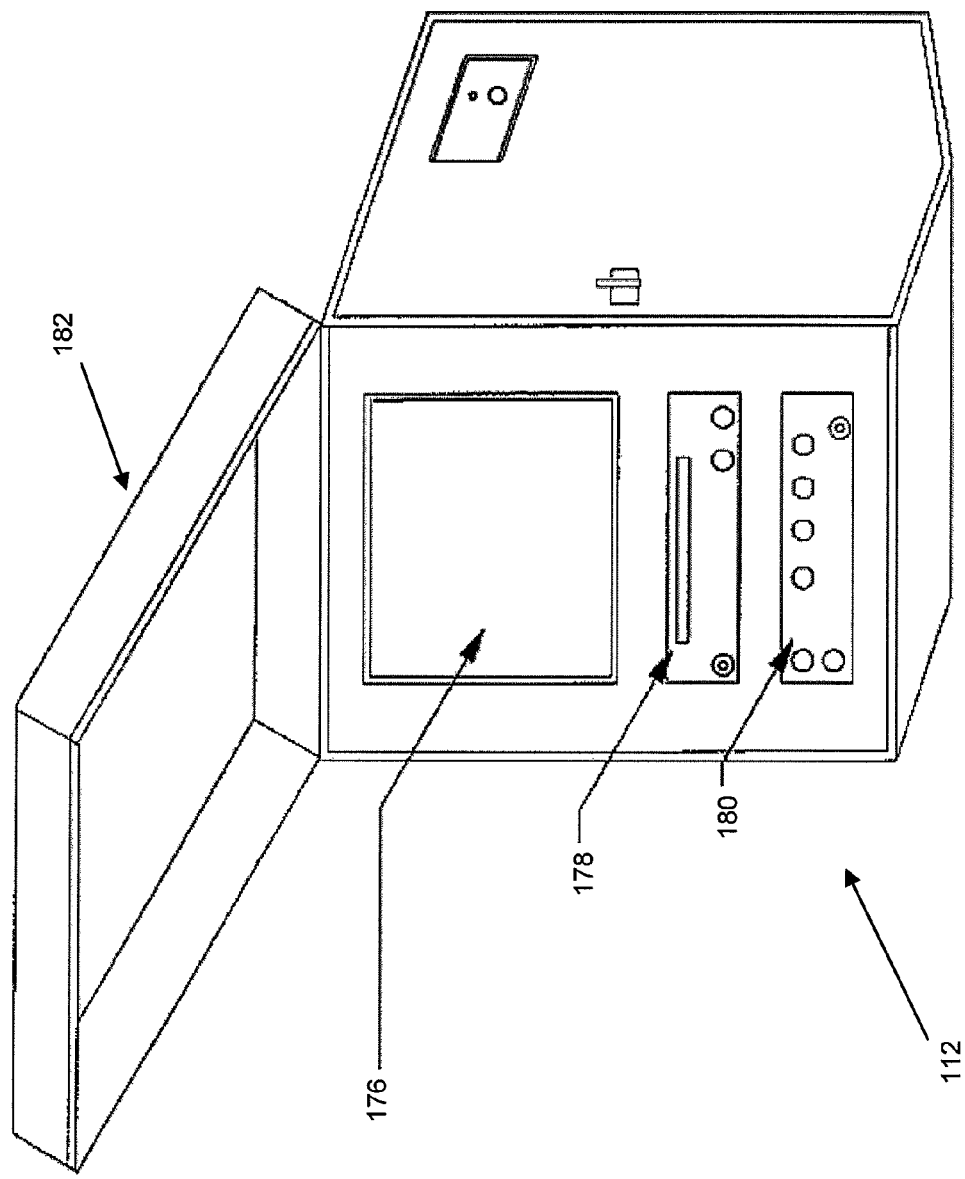
FIG. 8 is a perspective schematic view of a monitor useable to implement aspects of the present disclosure and incorporated into the system of FIG. 1.

Referring now to FIG. 8, additional details of the monitor 112 are shown. In the embodiment shown, the monitor 112 includes a display 176, a recorder 178, and a monitor control panel 180. The display 176 can be, in various embodiments, a cathode ray tube, plasma, or LCD display capable of displaying the images routed to the monitor 112 via the wire 158 from the video camera 154. Although any size display can be used, in the embodiment shown, an approximately 13-inch display is used.

The recorder 178 provides the operator the capability to record the video received from the video camera 154, to allow the operator (as well as the client of the operator, e.g. the owner/operator of the service station or storage facility at which the fuel tank is located). Additionally, the recorder can play back previously recorded video on the display 176. In the embodiment shown, the recorder 178 is a DVD recorder; however, other types of video recording systems could be used as well.

The monitor control panel 180 allows the operator to control the display 176, recorder 178, and the video camera 154, to perform the various functions of each piece of electronic equipment, respectively. For example, the monitor can activate or deactivate any of the display 176, recorder 178, and the video camera 154, and can set the display to display images from either the video camera 154 or played back from a recorded video on the recorder 178. Additional controls can be integrated into the monitor control panel 180 as well.

A cover 182 can be included in the monitor 112 as well, to protect the display 176, recorder 178, and control panel 180 as well. In the embodiment shown, the cover 182 is pivotally attached to a front upper edge of the monitor; however, various other configurations would be possible as well.

In further embodiments of the monitor 112, additional electronic and communications equipment could be included as well. For example, the monitor 112 can include a computing system having a wireless or wired communication link to allow remote individuals to view the cleaning process. This could be useful, for example, by the supervisor of the operator or by the client who owns/controls the fuel storage tank. The monitor 112 can also include a geographical positioning system (GPS) for tracking the location of the system 100 overall, to allow supervision of the operator and ensuring that fuel tanks at a correct location are being serviced.

Referring now to FIGS. 1-8 generally, other structures can be included in the housing 102. In the embodiment shown, a shelf 190 provides for additional storage of protective equipment and other miscellaneous items. A first aid kit 192 and a fire extinguisher 194 can be mounted within the housing for emergency access as well.

In use, an operator can move the system to a desired location at which fuel storage tanks to be cleaned are located. The operator can then access the hose 108, and extend it from the housing 102. At the opening of the fuel storage tank to be cleaned, the operator inserts a steering tube into the fuel storage tank. The steering tube can be any type of maneuverable or semi-rigid tube of sufficient diameter to receive the hose 108, and guide the hose into the storage tank. The operator guides the hose 108 into the storage tank through the steering tube.

Prior to activating the pump, the operator opens the emergency shut-off valve 116, and selects the filtration system to use via the filter selection valve 132 and the water separator valve 142. The operator activates the camera 154 and monitor 112 to allow viewing and/or recording of the cleaning process, as seen at the camera. The operator then activates the pump to begin drawing the fuel mixture into the hose 108 for filtration. In the embodiment shown, the hose receives fuel into the system at a flow rate of approximately 18 gallons per minute. However, this flow rate can be altered, depending upon the throughput capabilities of the filtration systems being used.

Any of a number of techniques can be used to clean the storage tank when the hose is inserted into the tank through the steering tube. In one possible method, the operator begins by steering the hose 108 to a far end of the tank, using the video camera 154 and monitor 112 to assist in guiding the hose. The operator then cleans using a slow sweeping motion as the hose is pulled back toward the operator (manually or by using the motor described in conjunction with FIG. 7). The fuel and other materials in the tank are then drawn through the hose and into the cleaning system described above. The sweeping motion can be repeated until the operator deems that the fuel storage tank is clean.

While the hose is being swept through the fuel storage tank, the operator can use the monitor 112, meter 122, and/or visual checkpoint 117 to determine whether to filter or discard portions of the fuel mixture received into the hose 108, and route that fuel mixture to a filtration system or waste tank accordingly. Additionally, the operator can select waste tanks, and can allow disposal of separated waste water, using the valves and system components described above.

While performing the cleaning process, the operator and/or the customer can also watch the cleaning process on the monitor 112, and record the cleaning process for their records. The operator can use the monitor 112, meter 122, and/or visual checkpoint 117 to determine that the cleaning system 100 is receiving largely clean, filtered fuel, and that little if any sediment or water remains in the fuel storage tank. Once the operator is satisfied that these conditions have occurred and the cleaning process has therefore been completed, the operator can remove the hose 108 from the fuel storage tank, allowing the fuel in the system 100 to drain back into the tank. The operator can then halt operation of the pump, stop recording the observed condition of the video camera 154, and return the hose and other materials to the housing 102. The operator can optionally provide to a customer a copy of the recorded cleaning process, and can tow the system 100 to a dumping location to empty the waste tanks, clean or change the filters, and otherwise perform maintenance on the fuel tank cleaning system.

During the cleaning process, a number of maintenance tanks can be performed. For example, as the operator is filtering the fuel, the various filters of the system 100 will become full of particles and will need cleaning and/or replacement. This can be signified, for example, by a high pressure reading on the meter 122 fixed to filter canisters near the control panel 114. If the operator is currently using the first filtration system 134, the operator can easily switch the filter selection valve 132 and the water separator valve 142 to use the second filtration system 136 without stopping operation of the overall system 100. The operator can then change the filters of the first filtration system 134 while the system is in operation, so that if needed, the operator can reverse the valves again to return to using the first filtration system 134 as needed.

Referring now to FIGS. 9-15, a second embodiment of system 200 for cleaning fuel storage tanks is illustrated. The system 200 generally provides the same functionality as the system 100 of FIGS. 1-8, above, but provides for a different arrangement of fuel filtration and disposal elements. The system 200 can also include a housing 102, which generally correspond to the housing described above in conjunction with the system 100, including side access openings 103 and rear access openings 105, and enclosing an interior area 104.

The system 200 includes a hose reel 206 for holding a hose 208, generally analogously to the system 100 of FIG. 1. The hose reel 206 generally corresponds to the reel 106 previously described, but includes a communicative connection to a docking station 212 rather than monitor 112. Additional details regarding the hose reel 206 are shown in FIG. 15, below. The hose 208 generally corresponds to the hose 108 previously described. However, in the embodiment shown, the hose 208 includes a video camera 210, described in greater detail in FIG. 14, below. The video camera 210 is configured to capture video images of the interior of a fuel storage tank, as previously described.

In the system 200, a computer docking station 212 is communicatively connected to the video camera 210, and receives images of the interior of the fuel storage tank being cleaned. The computer docking station 212 can receive a laptop or portable computer, or can include a built-in laptop or desktop computing system. The computer docking station 212 allows the operator to receive and transmit the video images of the cleaning process remotely (via wireless or wired communication networks) to clients or supervisors of the operator, to allow for remote supervision, training, or oversight of the cleaning process.

Figure 4:
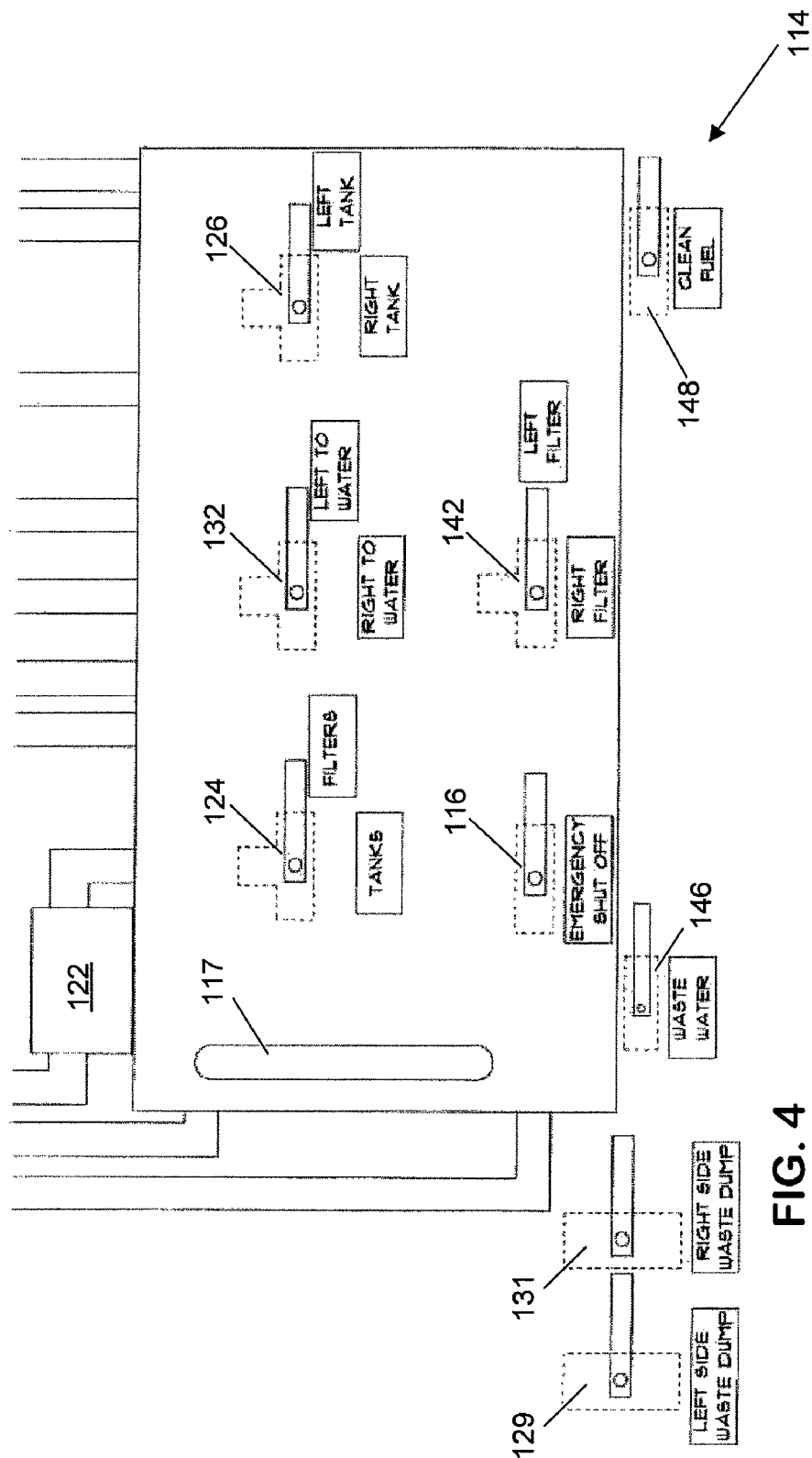
FIG. 4 illustrates a series of control panel fluidic connections useable to direct flow of liquid drawn from fuel storage tanks, as incorporated into the system of FIG. 1.

A control panel 214 generally corresponds to the control panel 114 of FIGS. 4-5, but is configured differently to provide control functionality for the various components of the system 200. From the hose 108 in the system 200, an unfiltered fuel mixture is drawn through the emergency shut-off valve 116 of the control panel 214, the operation of which has been previously described. From the emergency shut-off valve 116, the fuel mixture is routed through a first visual inspection point 217a, which is a clear section of conduit allowing a user to view the status of the fuel as it is received through the hose from a tank being cleaned. From the first visual inspection point 217a, the fuel mixture is routed to a gravel filter 218. The gravel filter 218 provides filtration of large particulate matter to protect the operating pumps arranged to direct the fuel mixture through the remainder of the filtration system, as described below.

It is noted that although in the embodiments shown in this disclosure a gravel filter is included in the systems 100, 200 described, in alternative embodiments, the gravel filter can be removed altogether.

From the gravel filter 218, the fuel mixture is routed to both an air-driven pump 220 and an electric pump 221. The air-driven pump 220 can be any of a variety of pumps activated via air pressure, and can be powered by an air compressor 150 as has previously been described. In certain embodiments, the air-driven pump 220 can be a diaphragm-type fuel pump made by Lincoln Industrial Corporation of St. Louis, Mo. Other pumps made by other manufacturers can be used as well. In the embodiment shown, the air-driven pump 220 receives air via a conduit from the air compressor 150, and to a control valve 253. The control valve 253 controls the amount of air flowing to the air-driven pump 220, thereby controlling the throughput of that pump.

Figure 9:
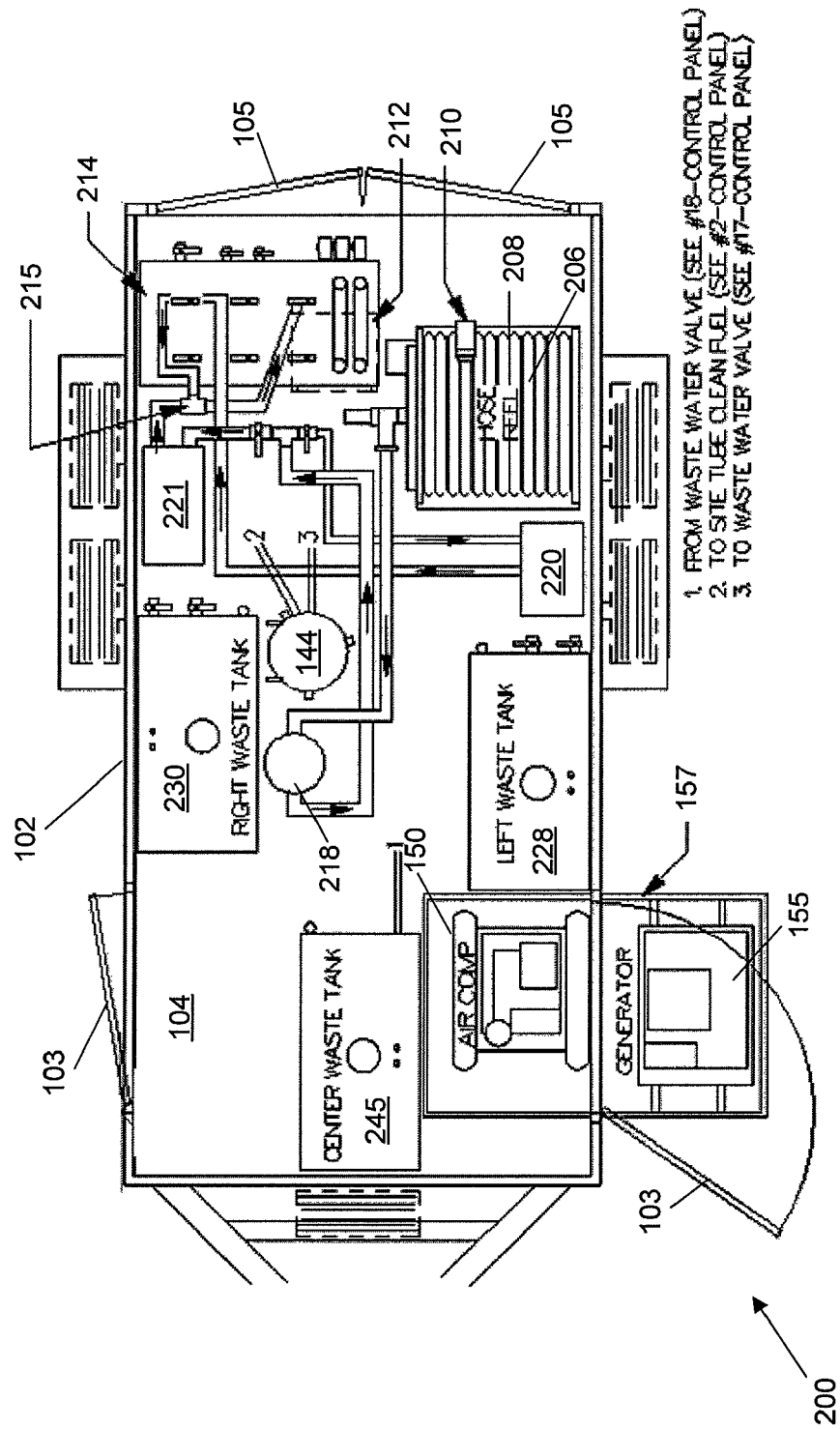
FIG. 9 is a floor plan of a system for cleaning fuel storage tanks, in accordance with a second possible embodiment of the present disclosure.
Figure 10:
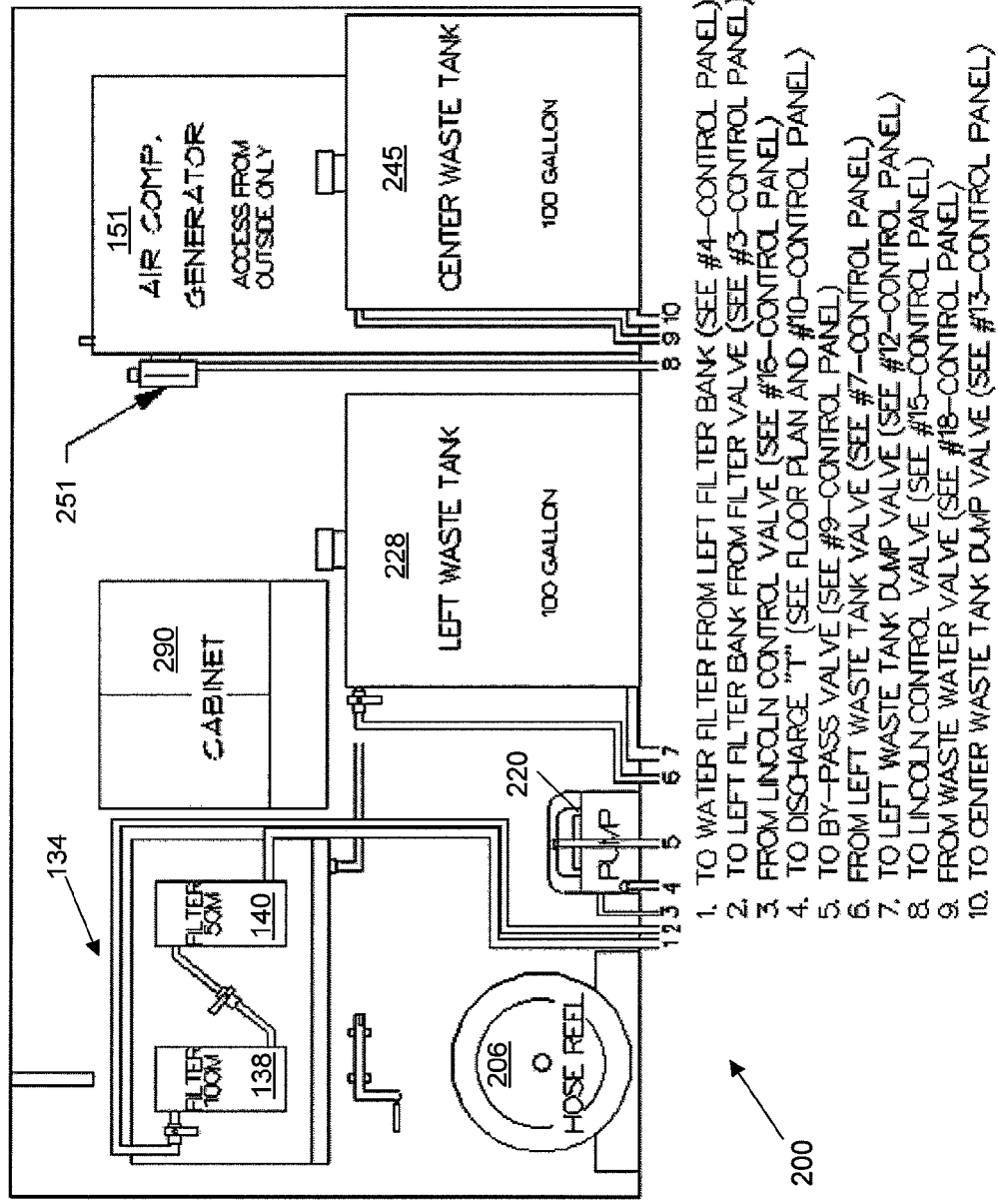
FIG. 10 is a left side schematic view of the system of FIG. 9.

The electric pump 221 can be powered by a generator, such as the generator 250 included in the system 200 at a tray 255 within the air compressor cabinet 151 (seen in FIG. 9). The electric pump 221 can be, in certain embodiments, a centrifugal, electrically-driven fuel pump made by The Gorman-Rupp Company of Mansfield, Ohio. Other electric fuel pumps can be used as well.

In the embodiment shown, a prime tank 223 is connected to the electric pump 221 to allow for priming of that pump to initiate its operation. The prime tank can be any size suitable to hold a sufficient amount of fluid to prime the electrical pump; in certain embodiments, the prime tank can hold about 8.5 gallons. A prime tank valve 225 opens the conduit connecting the prime tank 223 and the electric pump 221, allowing the operator to prime the electric pump 221 as needed.

In operation, one or both of the air-driven pump 220 and the electric pump 221 can be used to draw the fuel mixture from the fuel storage tank into the hose 208 and past the emergency shut-off valve 116. A bypass valve 227 can be used to bypass the air-driven pump 220 altogether, such as once the electric pump is primed and in operation.

From the pumps 220, 221, the fuel mixture is drawn back to the control panel 214 via a discharge T-junction 215. At the control panel 214, an operator determines whether to route the fuel mixture to be filtered or discarded. As with the embodiment of FIGS. 1-8, a route selection valve 124 allows selection of either filtering the fuel mixture or passing the fuel mixture to waste tanks. In the embodiment shown, if the route selection valve 124 is set to route the fuel mixture to waste tanks (i.e. the fuel mixture cannot be filtered), a tank selection valve 126 allows selection of the left or right waste tank 228, 230, respectively, connected as previously described. In this embodiment, the waste tanks 228, 230 are 100 gallon waste tanks; however, other sizes could be used as well.

If the route selection valve 124 is set to route the fuel mixture for filtration, a filter selection valve 132 allows selection of one of two two-stage filtration systems 134, 136. Each of the two-stage filtration systems 134, 136 are as previously described, having at least a first filter 138 and a second filter 140, providing coarse (e.g. to 100 microns) and finer filtration (e.g. to 50 microns).

From the filtration systems, the now-filtered fuel mixture is routed back to the control panel, and to a water separator valve 142. Again using the water separator valve 142 the operator selects the source of the fuel mixture (i.e. the first or second filtration systems 134, 136), and routes the fuel mixture to a water filter. The water filter separates water and fuel as previously described. The separated water is routed to a waste water valve 146 on the control panel 214, and to a further waste tank 245 (illustrated in FIGS. 9-10 as a center waste tank).

In certain embodiments, similarly to the system 100, an automated system can be used to switch between the first and second filtration systems 134, 136, actuating the filter selection valve 132 and the water filtration valve 142.

Each of the waste tanks 228, 230, 245 can be emptied by opening a corresponding valve at the control panel. In the embodiment shown, a first waste tank corresponds to a first waste dump valve 229, a second waste tank 230 corresponds to a second waste dump valve 231, and a third waste tank 245 corresponds to a third waste dump valve 247.

A clean fuel valve 148 is used by the operator to return filtered fuel to the fuel storage tank being cleaned. In the embodiment shown of system 200, a second visual inspection point 217b is provided, allowing the operator to view the state of the fuel returning from the system to the tank being cleaned. In the embodiment shown (particularly in FIGS. 12-13) the visual inspection points 217a-b are located in close proximity to allow easy comparison between the state of fuel entering and exiting the system 200.

In certain situations, the waste tanks 228, 230, 245 are to be emptied into an elevated holding tank. Therefore, certain embodiments of the system include a connection between the air compressor 150 and the waste tanks to pressure-pump the waste fluid from the tanks. A regulator 251 is connected between the air compressor 150 and the tanks, to maintain an approximate pressure of about 8-10 psi to ensure that the tanks are not ruptured during this emptying process.

Figure 11:
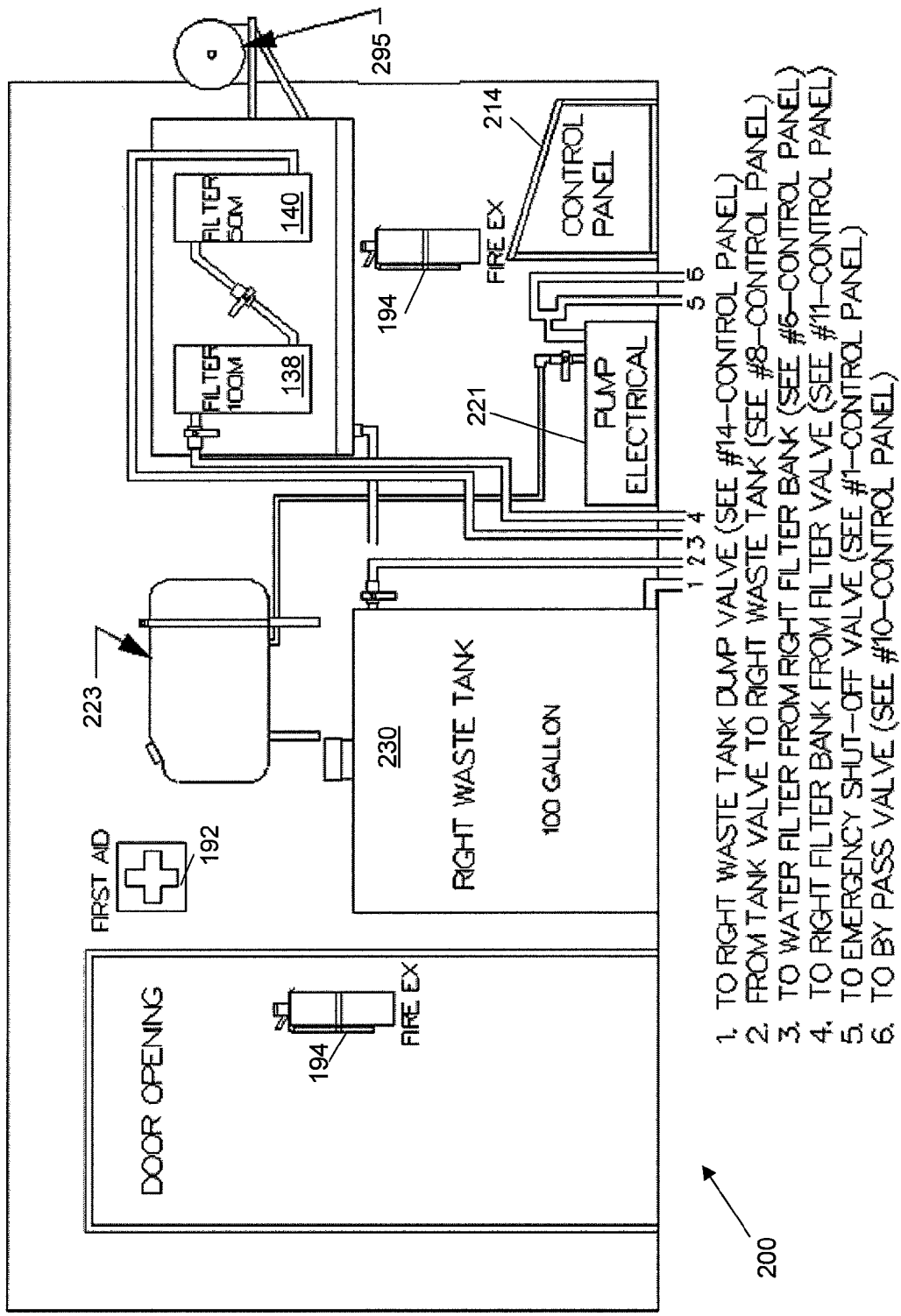
FIG. 11 is a right side schematic view of the system of FIG. 9.
Figure 12:
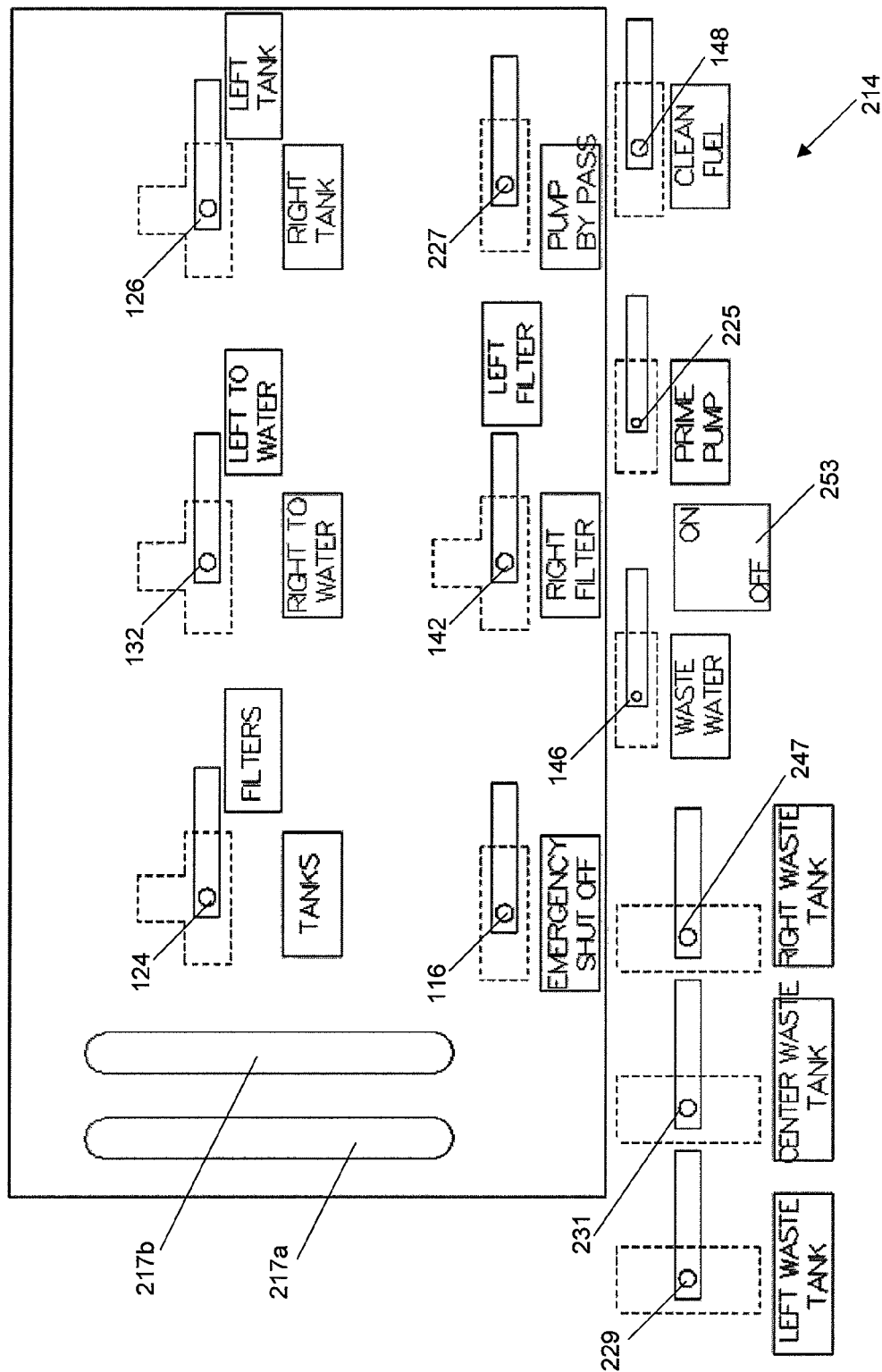
FIG. 12 illustrates a series of control panel fluidic connections useable to direct flow of liquid drawn from fuel storage tanks, as incorporated into the system of FIG. 9.
Figure 13:
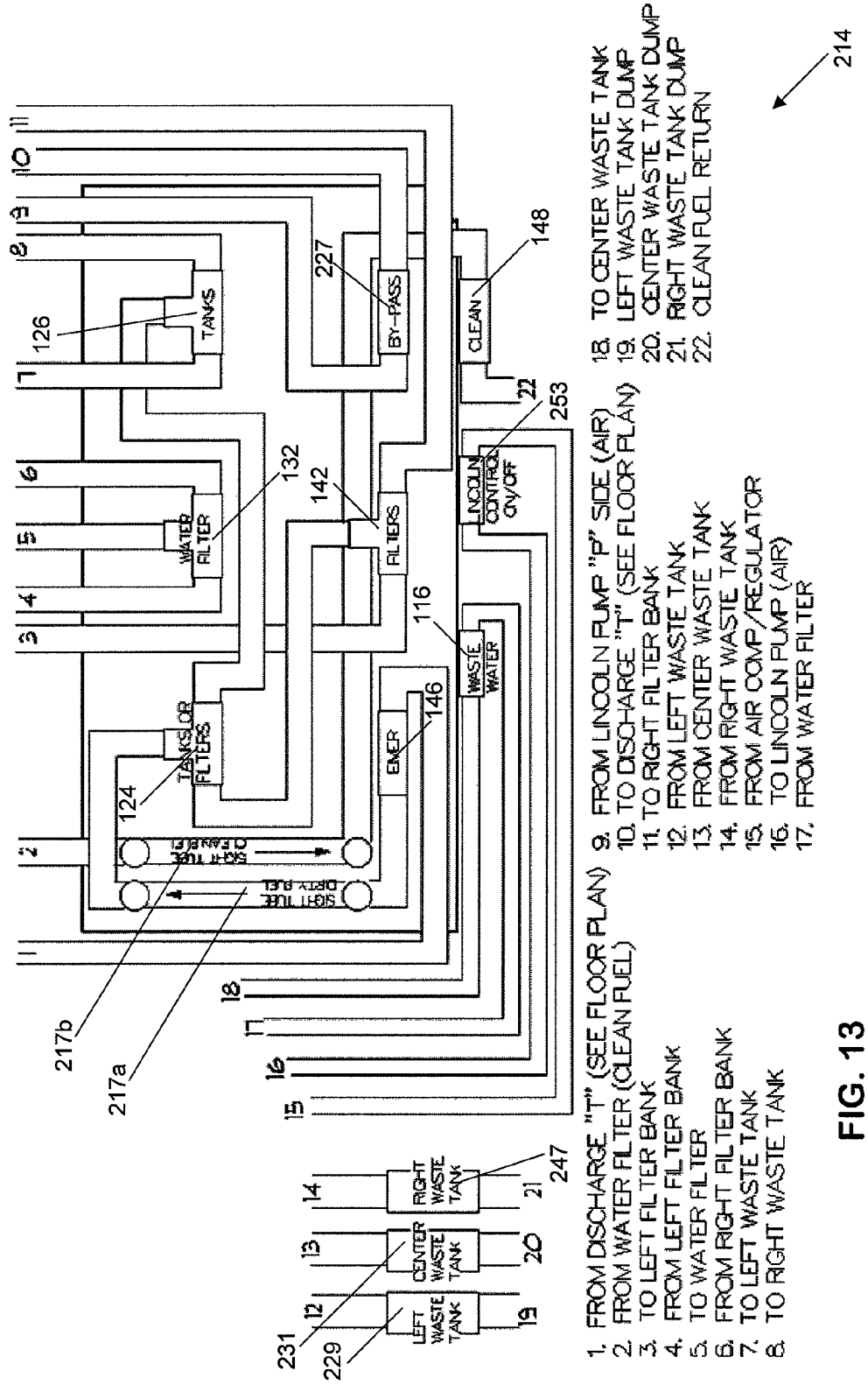
FIG. 13 illustrates the control panel valves useable to control the fluidic connections shown in FIG. 12.

In the system 200, optional safety and storage features can be included as well, as in the system 100 of FIGS. 1-8. As illustrated in FIG. 11, a static discharge reel 295 connects to at least a portion of the housing, and ensures that an operator is not electrically shocked by contact with the control panel 214, generator 155, or other components in the system 200. Furthermore, in the embodiment shown, a cabinet 290 is included for storage of materials (e.g. recordable media for recording the cleaning process, protective equipment, etc.). Additionally, a first aid kit 192 and a pair of fire extinguishers 194 are included within the housing 102. Other equipment can be included as well.

Figure 14:
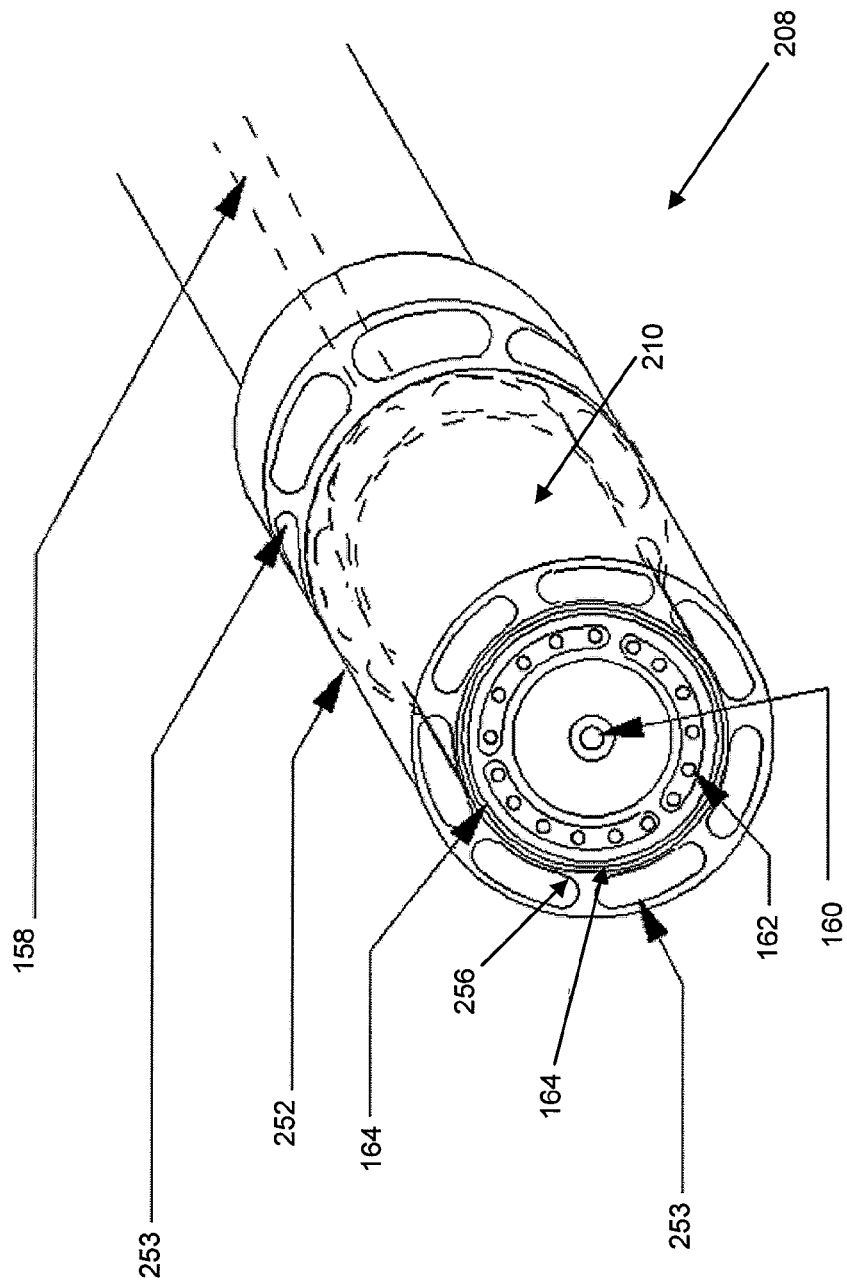
FIG. 14 is a schematic view of a hose end having an integrated video camera, in accordance with a further possible embodiment of the present disclosure.
Figure 15:
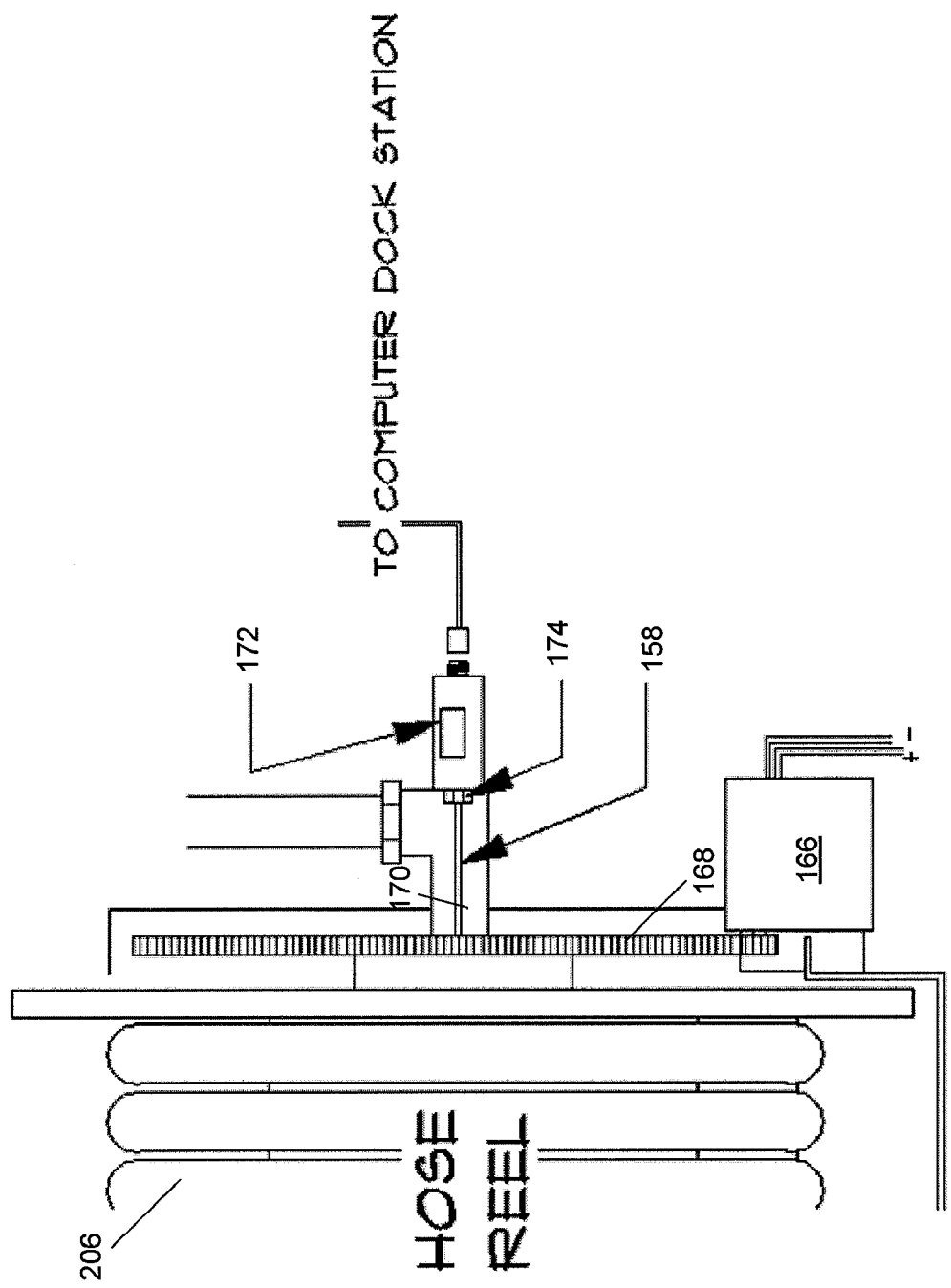
FIG. 15 is a partial schematic view of a hose reel useable in the system of FIG. 9.

Referring now to FIG. 14, the hose 208 is shown, according to a possible embodiment of the present disclosure. In this embodiment, the hose 208 also includes a nozzle 252 and inlets 253, as well as a video camera 210. The nozzle 252 and inlets 253 generally are analogous to the nozzle 152 and inlet 153 described in conjunction with FIG. 6, above, but are adjustable to increase or decrease the size of the inlets 253 to increase or decrease the fuel flow rate into the hose 208. This may be particularly useful, for example, in situations in which a fuel tank contains a large amount of particulate matter, which may block smaller fuel inlets 253. In such embodiments, the inlets 253 can be adjusted by twisting portions of the nozzle 252 into a secondary, locked position to provide greater throughput in the nozzle.

In general the video camera 210 corresponds to the camera 110 of FIG. 6, but is mounted within the nozzle 252 by a centering structure 256, which allows openings through forming the inlet 253 while providing structure for maintaining the camera 210 centered in the nozzle 252.

A wire 158 runs through the hose to the hose reel 206, and carries power to the video camera and the video signal back to the system 100 (e.g. to the docking station 212). Other video or electrical signals can be carried along the wire as well.

In the embodiment shown, the camera 210 also includes a self-leveling color lens 160, such as are provided by MyTana Manufacturing Co. of St. Paul, Minn. An array of light emitting diodes 162 are positioned in a concentric circle around the camera 210, and oriented outward from the end of the nozzle 252. A sapphire lens 164 can be placed over the light emitting diodes 162 to protect the diodes while allowing light to pass through. Furthermore, the array of light emitting diodes 162 and video camera 210 are housed within a protective housing 164, which is held within the nozzle 252 by the centering structure 256. These components are analogous to those described in conjunction with FIG. 6, above.

As with the camera 110, above, the video camera 210 is illustrated as integrated into the nozzle 252, but it is understood that in alternative embodiments the video camera 210 can be separated from the nozzle 252 and oriented to allow a user to view the portion of the interior of the fuel tank to be cleaned.

Referring now to FIG. 15, details of the hose reel 206 are disclosed. Generally the hose reel 206 corresponds to the hose reel 106 of FIG. 7, but the wire 158 leads to a docking station 212 rather than the monitor 112 (seen in FIG. 9). The remaining components are as previously described.

Figure 17:
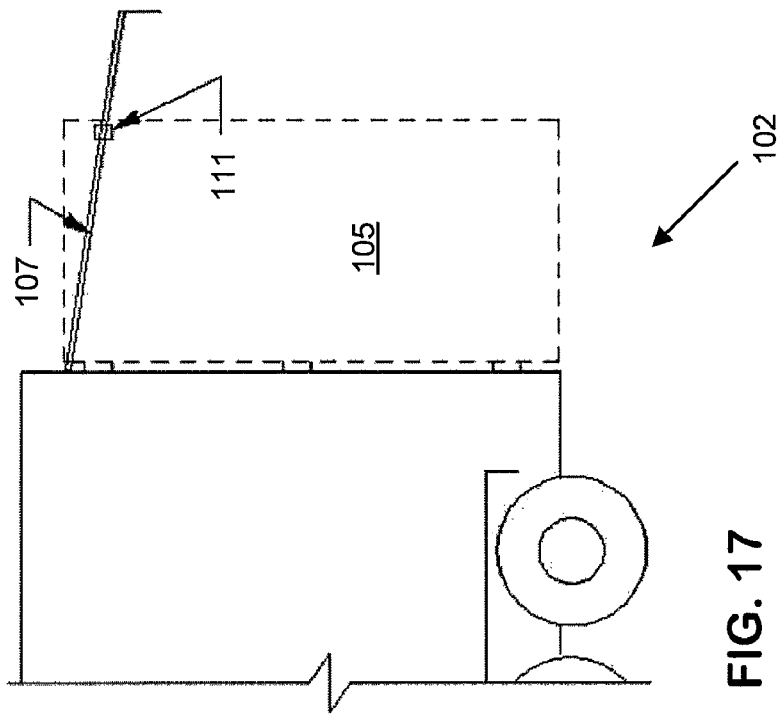
FIG. 17 is a side plan view of a portion of the housing of FIG. 16.
Figure 16:
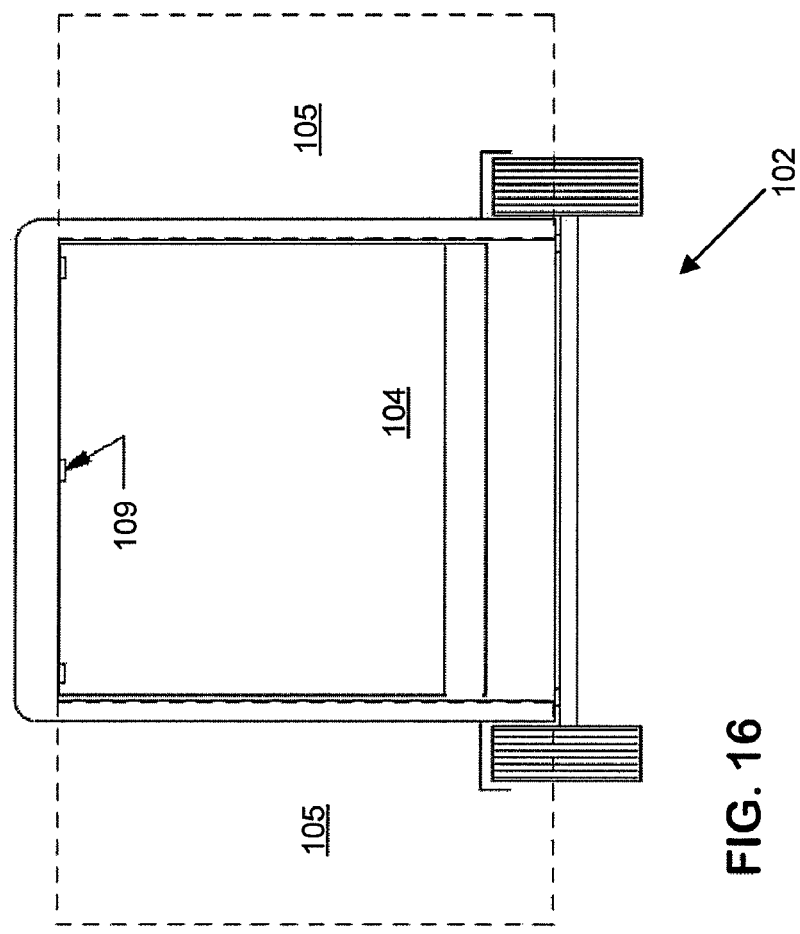
FIG. 16 is a rear plan view of features of a housing useable to implement aspects of the various embodiments of the fuel cleaning systems disclosed herein.

FIGS. 16-17 illustrate features of the housing 102 useable in the various embodiments of the systems for cleaning a fuel storage tank disclosed herein. FIG. 16 is a rear plan view of the housing, and FIG. 17 illustrates a side plan view of a portion of the housing. As illustrated, the housing includes side doors 103 and rear doors 105, allowing access to the interior area 104 of the housing 102. In the embodiment shown, the rear doors 105 can connect to and support a swing-out awning 107 that can pivot outwardly from the housing when the rear doors 105 are opened. The awning 107 is hinged at one or more top hinges 109 or other pivot points, and connects to the rear doors 105 at connection points 111 on one or both rear doors to support the awning in an upright position when in use. The awning 107 can provide environmental protection to the operator while cleaning the fuel storage tanks. When in transport or storage, the awning is dropped and resides within the interior area 104.

In general, the system 200 can be used in an analogous cleaning process to the system 100 of FIGS. 1-8, e.g. by inserting the hose into a fuel storage tank using a steering tube and drawing the hose across a surface of the tank. However, certain differences in use are apparent from the differing features between the systems. For example, the system can be configured to capture video images for remote display, and the setup of the cleaning process can include establishing a communicative connection between a computer at the docking station 212 and a remote computer (e.g. at a supervisor or client location). Furthermore, the operator can initiate operation using the air-driven pump 220 until the electrical pump 221 has been primed and all air is removed from the filtration system, at which time the operator can activate the bypass valve 227 and use only the electrical pump 221. Additionally, the operator can, once completed, empty the waste tanks 228, 230, 245 using the air compressor 150 in the manner previously described. Other differences may exist as well.

Although in the embodiments described herein two separate two-stage filtration systems can be used, in other embodiments, other numbers of filtration systems could be used instead. Additionally, the locations of the various filtration systems, waste tanks, and other components can be altered without departing from the spirit and scope of the present disclosure.

Furthermore, although the methods and systems described herein are referenced as used in cleaning fuel tanks, it is understood that it is the contents of a fuel tank being cleaned, with the cleaning of the fuel tank itself an attendant effect of clean contents (i.e. cleaned fuel).

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for cleaning a fuel storage tank, the system comprising:
   a plurality of filter elements mounted within a portable housing;
   a hose in fluidic connection to at least some of the filter elements, the hose extendable from the portable housing and into an interior of a fuel storage tank, the hose having a nozzle including an inlet;
   a pump in fluidic connection with one or more of the filter elements and configured to draw contents of the fuel storage tank into the hose and forward the contents through the one of more filter elements; and
   a video camera integrated into the nozzle of the hose and configured to capture video images of the interior of the fuel tank in an area proximate to the nozzle of the hose during cleaning.

2. The system of claim 1, further comprising a recorder communicatively connected to the video camera and configurable to record the video images on a recording medium.

3. The system of claim 1, further comprising a monitor communicatively connected to the video camera and useable to display the video images.

4. The system of claim 1, further comprising an air compressor configured to drive the pump.

5. The system of claim 1, further comprising a control panel including a plurality of valves, the control panel allowing a user to selectably direct fuel through one or more of the plurality of filter elements.

6. The system of claim 1, further comprising a waste tank within the portable housing and arranged to receive waste drawn through the hose from the fuel storage tank.

7. The system of claim 1, wherein the plurality of filter elements includes at least first and second filtration systems.

8. The system of claim 7, further comprising one or more valves arranged to select between the first and second filtration systems.

9. The system of claim 8, wherein the valves are switched in response to an observed pressure upstream of the first and second filtration systems.

10. The system of claim 1, further comprising a hose reel arranged to receive the hose, the hose reel further including a fluid conduit and a communicative connection to the video camera.

11. The system of claim 1, wherein the nozzle further includes a light source arranged to project toward an interior surface of the fuel tank.

12. A system for cleaning a fuel storage tank, the system comprising:
   a plurality of filter elements mounted within a portable housing;
   a hose in fluidic connection to at least some of the filter elements, the hose extendable from the portable housing and into an interior of a fuel storage tank, the hose having a nozzle including an inlet;
   a pump in fluidic connection with one or more of the filter elements and configured to draw contents of the fuel storage tank into the hose and through the one or more filter elements; and
   a video camera configured to capture video images of the interior of the fuel tank, the video camera integrated into the nozzle of the hose; and
   a recorder communicatively connected to the video camera and configurable to record the video images on a recording medium.

13. The system of claim 12, wherein the recorder includes a computing system communicatively connected to the video camera.

14. The system of claim 13, further comprising a remote computing system communicatively connected to the video camera, the remote computing system configured for remote display of the video images.

15. The system of claim 12, further comprising a conduit interconnecting the hose, pump, and plurality of filter elements, the conduit including at least one clear section providing a visual inspection point.

* * * * *